Patented Mar. 14, 1950

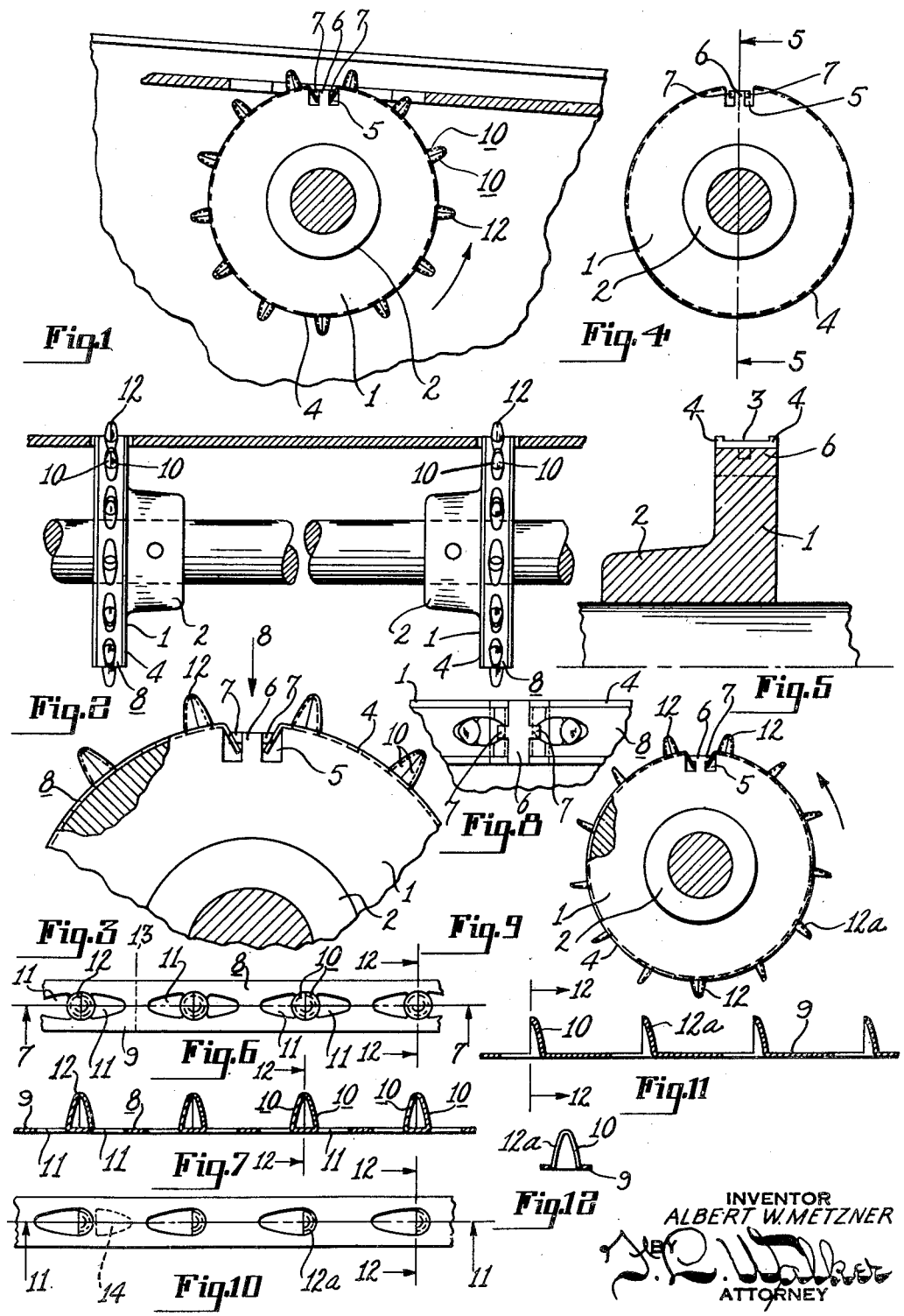

2,500,196

UNITED STATES PATENT OFFICE 2,500,196

PIN TYPE FEEDING DEVICE

Albert W. Metzner, Dayton, Ohio, assignor to The Standard Register Corporation, Dayton, Ohio, a corporation of Ohio Application July 24, 1942, Serial No. 452,149

14 Claims. (Cl. 74—243)

This invention pertains to an improved form of pin wheels or sprockets and pin type conveyor belts, and the method of manufacture thereof, and more particularly to an integral pin and carrier construction.

In the manufacture of pin wheels for strip feeding apparatus for recording, writing and imprinting machines and the like, it has been customary to cast a metal disc with an integral hub, drill radial holes in the periphery of the disc and separately form a series of tapered pins which are driven into the radial holes, after which the assembly must be inspected and gaged to assure proper spacing and relative inclination of the pins. Such method is expensive, time consuming, and results in excessive waste of inaccurate and improperly made units.

The presently described method of manufacture enables rapid and accurate production of a unitary, integrally series connected, uniformly spaced and shaped feeding pins and carrier band by automatic punch press or stamping operations, for quick snap assembly upon a supporting disc.

The object of the invention is to improve the construction and method of manufacture of pin wheels and pin type conveyor belts, whereby they may not only be economically manufactured, but will be more accurately constructed, capable of being easily and quickly assembled, and unlikely to get out of repair.

A further object is to provide an integral pin carrying tape or belt unit.

A further object is to provide a simple, quick and effective mode of manufacture and assembly of pin type conveyor or feeding units.

A further object of the invention is to provide a pin wheel or pin carrying conveyor belt, or the like, having the advantageous structural features and inherent meritorious characteristics and method of manufacture herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a fragmentary side elevation of a portion of an autographic register or recording apparatus, wherein a pin wheel embodying the present invention is included.

Fig. 2 is a front elevation of a pair of rotary pin wheels, such as are employed in a recording apparatus for feeding marginally punched record strips, in which the present invention is embodied.

Fig. 3 is an enlarged detail side view, partly in section, of a pin wheel constructed according to the present method.

Fig. 4 is a side elevation of the main body or mounting disc of a pin wheel preparatory to receiving the present unitary pin bearing band.

Fig. 5 is a detail sectional view of one-half of the main body or mounting disc shown in Fig. 4.

Fig. 6 is a top plan view of the punched and formed unitary pin bearing belt or tape prior to assembly.

Fig. 7 is a longitudinal sectional view of the pin bearing tape or belt.

Fig. 8 is a top plan view of a fragmentary portion of the assembled pin wheel showing the engaged ends of the surrounding tape.

Fig. 9 is a side elevation of a modification of the pin wheel construction employing half pins, except three whole pins disposed for form locating purposes.

Fig. 10 is a top plan view of the tape or band bearing half pins such as those incorporated in the pin wheel of Fig. 9.

Fig. 11 is a longitudinal sectional view of the pin bearing tape shown in Figs. 9 and 10.

Fig. 12 is a transverse sectional view of either the whole or half pin style of tape on line 12—12 of Figs. 6, 7, 10 and 11.

Like parts are indicated by similar characters of reference throughout the several views.

It has been more or less common to employ either rotary pin wheels or traveling pin carrying conveyor belts to progressively advance continuous strips of record forms past the recording position of an autographic register, typewriter, tabulator, or other recording apparatus by engaging relatively spaced pins of the pin wheels or conveyor belts in correspondingly spaced holes in the record strips.

For efficient and successful operation, it is necessary that the traveling feeding pins be accurately and uniformly shaped and spaced. To produce such units by drilling a mounting disc and separately forming a series of pins to be driven in the drilled holes, or to perforate a carrier strip or belt and rivet a series of independently formed pins thereto, involves expensive and laborious hand operations, and results in inaccurate units and consequent waste parts. In the herein disclosure there is contemplated a series of spaced pins and a carrier band which are integrally united into a unitary structure.

Referring to the drawing, there is employed a main body or disc 1, preferably but not necessarily of cast metal, having formed thereon an integral hub 2. This supporting body 1—2 may be molded from plastics or even from wood pulp, or formed of wood or other non-metallic material, which serves to further materially reduce the cost of production.

The supporting disc 1 is peripherally grooved at 3, which forms low side flanges 4. It is further notched at 5, within which is an upstanding radial stud 6 having on each side oppositely disposed short ears or lugs 7—7.

A pin bearing tape or band 8 surrounds the supporting disc 1 within the peripheral groove 3 thereof. Such tape or band may be produced in continuous stock strips of indeterminate length by passing flat metallic strips 9 through a punching and forming apparatus. The stock strip is pierced at accurately spaced intervals to form pairs of oppositely disposed elongated tapered tongues 10 which leave in the strip 9 a succession of alternately disposed openings or slots 11. The tongues removed from the openings 11 are bent upwardly and formed into concavo-convex, semiconical protuberances, each comprising one-half of a tapered conical hollow pin 12, the other half of which is similarly formed from the reversely disposed adjacent tongue removed from the other space 11 of each pair of tapered slots or openings. Being pressed tightly together the two complementary half concavo-convex pins form a whole hollow tapered pin which is integral with the initial metallic carrying strip. The disc 1 and tape or pin bearing band are so proportioned that a given length of the tape or band will exactly meet around the periphery of the disc with the pins uniformly spaced thereabout.

The band or tape is severed on a line 13—13 between two reversely disposed tapered slots or openings 11 and medially between two adjacent pins 12, to afford a length thereof commensurate with the peripheral dimension of the mounting disc within the groove 3 thereof. Such length of the stock pin bearing strip is tightly disposed about the disc 1 within the peripheral groove 3 and its ends are pressed within the notch 5 at opposite sides of the tongue 6. The inherent resiliency of the metallic strip material will cause the inserted ends of the strip to spring back upon the ears or lugs 7, which engage within the terminal slots or openings 11 of the measured length of pin bearing band. Thus, the ends of the peripheral band are hooked securely upon the lugs or ears 7 and retain the band in adjusted position about the disc. The side of the disc and the length of the band are such that the radial pins 12 at opposite sides of the notch 5 and juncture point of the pin band extremities are spaced apart exactly the same distance as other pins of the series.

For some conditions of use it may not be necessary to use complete conical pins, and half pins will serve the desired purpose. In such event only single tongues 10 will be struck from the stock strip 9 at prescribed intervals. Such tongues, as before described, are bent upward and formed into concavo-convex, semi-conical pins 12a, as shown in Figs. 10 and 11. The band or tape carrying such semi-conical pins is arranged on the mounting disc or on other driving apparatus, so that it advances with the convex sides of the pins foremost, as indicated by the arrow in Fig. 9. In the event that the half pin tape or band of Figs. 10 and 11 is employed about a disc as in Fig. 9, an additional hole 14, shown by dotted lines in Fig. 10, is provided at one terminal of the band for engagement of one of the ears or lugs 7, the other of which is engageable in the opposite terminal slot 11 from which a half pin tongue was struck up. When the pin wheel incorporating the half pin formations of Figs. 10 and 11 is used in an autographic register, it is desirable that whole pins 12 be formed at the point or points where a feeding pin comes to rest in engagement with the record material at the end of the rotary feeding operation.

Such whole pins will then more nearly fill the holes in the record material to limit the range of relative shifting motion of the record material while being inscribed. If the pin wheel is one which advances a desired length of record material at each half rotation, and contains an odd number of pins, two whole pins 12 are provided at one side and one whole pin at the opposite side of the pin wheel, as shown in Fig. 9. Thus, at one operation the pin wheel will come to rest with the single whole pin 12 uppermost and in engagement with the record material, while at the next operation two whole pins will stop in the uppermost position but neither will be on the exact vertical diameter of the pin wheel.

In addition to being used to enable economical construction of pin wheels, the continuous pin bearing strips illustrated in Figs. 6, 7, 10 and 11 may be utilized as traveling conveyor belts when connected into endless form for travel movement about relatively spaced pulleys or guides. One of the belt guides may be a sprocket wheel having teeth or pins engageable in the spaced slots or openings 11 of the tape for positively advancing the latter. There are numerous instances wherein endless flexible pin bearing chains are employed in autographic registers, tabulating and billing machines and other recording apparatus for advancing record material past a recording position, for either of which the present integral pin and belt construction may be substituted. Furthermore, while the invention is herein shown and described as embodied in pin wheel and conveyor belt constructions for feeding series punched record material in a recording apparatus, it is to be understood that such reference and description is for illustrative purpose and that the invention in other size and design may be adapted to feeding and motion transmitting operation other than record material advancement, and the invention is therefore not limited thereto.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A pin wheel or sprocket unit, including a rotary disc having a peripheral groove therein, and a peripheral recess intersecting the groove, a stud in said recess, spurs on the stud, a strap of material surrounding the disc and seated in the peripheral groove thereof, a succession of spaced teeth integral with the strap and projecting therefrom in radial relation with the disc, each tooth comprising a pair of reversely contoured tongues struck from the material of the strap in contacting relation, the ends of the strap being depressed within the peripheral recess of the disc and having holes in which the spurs of the stud are engageable.

2. A pin wheel or sprocket unit, including a rotary disc having a peripheral groove therein, and a peripheral recess intersecting the groove, a stud in said recess, spurs on the stud, a strap of material surrounding the disc and seated in the peripheral groove thereof, a succession of spaced teeth integral with the strap and projecting therefrom in radial relation with the disc, the ends of the strap being depressed within the peripheral recess of the disc and having holes in which the spurs of the stud are engageable.

3. As an article of manufacture, an integral toothed band comprising a strip of material, a plurality of relatively spaced pairs of tongues struck from the material of the strip in oppositely disposed relation with their adjacent ends united with the strip, said tongues being extended perpendicularly to the plane of the strip and reversely contoured into concavo convex semi-conical formations disposed in substantially contact relation with their concave sides adjacently disposed to conjointly form complete hollow conical studs integral with the strip.

4. As an article of manufacture, an integral toothed band comprising a strip of material, a plurality of relatively spaced tongues struck from the material of the strip in reversely disposed end to end relation longitudinally of the strip, with the adjacent ends of succeeding pairs of tongues remaining integrally united with the strip, said tongues being extended substantially perpendicularly to the plane of the strip and transversely contoured into concavo convex semi-conical formations to form a succession of projecting teeth integral with the band.

5. A pin wheel or sprocket unit, including a rotary supporting body having a peripheral groove therein, a surrounding band seated in the peripheral groove of the supporting body, a succession of relatively spaced teeth formed integrally with the band and projecting therefrom in substantially radial relation with the rotary supporting body, said band being connected with the support for unison rotation therewith.

6. A pin wheel or sprocket unit, including a rotary supporting body having therein a shallow peripheral groove, a surrounding band seated within the peripheral groove of said supporting body, a succession of integral tongues struck from the material of the band into angularly projecting relation therewith, said tongues each being integrally united at one end thereof with the band and transversely contoured into concavo convex semi-conical formation affording tapered integral pins projecting in approximately radial relation with the supporting body, and an interlocking connection between the band and body within the peripheral groove of the latter interengaging said members for unison rotation.

7. As an article of manufacture, a toothed belt comprising a continuous strip of material, a succession of pairs of oppositely disposed tapered tongues struck from the strip of material with their adjacent ends integrally united therewith, the tongues being projected in substantially perpendicular relation with the strip of material and reversely contoured in concavo convex formation with their concave sides adjacent to conjointly form hollow conical studs integral with the strip of material.

8. As an article of manufacture, a toothed belt comprising a continuous strip of material, a succession of integral tongues struck from the strip of material to substantially perpendicular relation thereto, said tongues being transversely contoured in concavo convex tapered formation with the terminal and lateral marginal edges of the individual tongues disposed in a common plane, substantially perpendicular to the belt to form semi-conical studs integral with the strip of material.

9. The herein described method of forming a toothed unit, including the steps of incising a strip of material to form therein a plurality of pairs of reversely disposed tapered tongues integrally united with the strip at their adjacent ends, projecting the tongues into substantially perpendicular relation with the strip, contouring the tongues into reverse concavo convex with their concave sides in approximately abutting relation to thereby form a succession of integral hollow tapered studs.

10. As an article of manufacture, a continuous carrier strip of material and a succession of longitudinally spaced reversely disposed integral concavo-convex tongues arranged in pairs, comprising hollow conical studs formed from the material of the strip.

11. The herein described method of forming a toothed unit, including striking a succession of longitudinally spaced integrally attached tongues from a continuous strip of material, transversely contouring the tongues into concavo convex tapered formation with their terminal and lateral marginal edges disposed in a common plane and projecting the tongues in substantially perpendicular relation with the strip at the point of its juncture therewith.

12. A toothed unit, including a continuous strip of material, and a plurality of pairs of reversely disposed, concavo-convex tongues jointly comprising relatively spaced hollow conical studs integrally formed upon the strip.

13. A toothed unit, including a continuous strip of material and a plurality of relatively spaced hollow conical studs integrally formed upon the strip, each hollow stud comprising two half studs of concavo convex tapered form independently attached to the strip and reversely disposed with their concave sides contiguous to a common plane.

14. A toothed unit, including a continuous strip of material and a succession of relatively spaced hollow conical studs integrally formed upon the strip, each stud including a pair of adjacent, reversely disposed concavo convex tapered tongues struck from the strip of material.

ALBERT W. METZNER.

REFERENCES CITED

The following references are of record in the file of this patent:

UNITED STATES PATENTS

| Number | Name | Date |
|---|---|---|
| 548,591 | Rau | Oct. 22, 1895 |
| 779,165 | Junghans | Jan. 3, 1905 |
| 1,108,683 | Bird | Aug. 25, 1914 |
| 1,482,896 | Huntington et al. | Feb. 5, 1924 |
| 1,736,758 | Ball | Nov. 19, 1929 |
| 1,943,620 | Murray | Jan. 16, 1934 |